(12) United States Patent
Ng

(10) Patent No.: US 9,379,872 B2
(45) Date of Patent: *Jun. 28, 2016

(54) CHANNEL QUALITY INDICATOR METHOD, AND ASSOCIATED SYSTEM, BASE STATION, AND USER EQUIPMENT

(71) Applicant: NEC CORPORATION, Tokyo (JP)

(72) Inventor: Boon Loong Ng, Victoria (AU)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 28 days.

This patent is subject to a terminal disclaimer.

(21) Appl. No.: 14/094,102

(22) Filed: Dec. 2, 2013

(65) Prior Publication Data

US 2014/0086114 A1    Mar. 27, 2014

Related U.S. Application Data

(62) Division of application No. 13/590,695, filed on Aug. 21, 2012, which is a division of application No. 13/543,172, filed on Jul. 6, 2012, which is a division of application No. 13/257,462, filed as application No. PCT/JP2010/055144 on Mar. 17, 2010, now Pat. No. 9,077,503.

(30) Foreign Application Priority Data

Mar. 19, 2009    (AU) ................................ 2009901196

(51) Int. Cl.
H04L 5/00    (2006.01)
H04L 1/00    (2006.01)
(Continued)

(52) U.S. Cl.
CPC ............. *H04L 5/0057* (2013.01); *H04J 3/1694* (2013.01); *H04L 1/0026* (2013.01);
(Continued)

(58) Field of Classification Search
CPC ..... H04L 1/0026; H04L 5/006; H04L 5/0057; H04L 5/14; H04L 1/0028; H04L 5/0035; H04L 5/0048; H04L 5/0016; H04L 5/00; H04W 24/10; H04W 16/14; H04J 3/1694
See application file for complete search history.

(56) References Cited

U.S. PATENT DOCUMENTS 8,149,749 B2 *  4/2012  Maeda et al. ................. 370/311
8,379,507 B2     2/2013  Bertrand et al.
(Continued)

FOREIGN PATENT DOCUMENTS

CN        101369843           2/2009
WO        WO 2007/145035     12/2007
WO        WO 2007/145035 A1 * 12/2007

OTHER PUBLICATIONS

International Search Report PCT/JP2010/05514 dated Apr. 27, 2010.
(Continued)

*Primary Examiner* — Khaled Kassim
*Assistant Examiner* — Zhaohui Yang

(57) ABSTRACT

It would be to provide a method which will work with future versions of LTE-A, be backwards compatible and alleviate interference to signals for basic system operation. The method includes generating one or more Reference Signals associated with the one or more Channel Quality Indicators, and includes mapping the one or more Channel Quality Indicator-Reference Signals to the last symbol of the second slot of the one or more subframes.

30 Claims, 9 Drawing Sheets

(51) Int. Cl.
*H04W 24/10* (2009.01)
*H04J 3/16* (2006.01)
*H04L 5/14* (2006.01)
*H04W 16/14* (2009.01)

(52) U.S. Cl.
CPC ............ *H04L1/0028* (2013.01); *H04L 5/0035* (2013.01); *H04L 5/0048* (2013.01); *H04L 5/14* (2013.01); *H04W 24/10* (2013.01); *H04L 5/0016* (2013.01); *H04L 5/0053* (2013.01); *H04W 16/14* (2013.01)

(56) References Cited

U.S. PATENT DOCUMENTS

| | | | |
|---|---|---|---|
| 2006/0009227 A1* | 1/2006 | Cudak et al. | 455/450 |
| 2008/0267165 A1* | 10/2008 | Bertrand et al. | 370/350 |
| 2009/0041139 A1* | 2/2009 | Cho | H04L 1/0026 375/260 |
| 2009/0046570 A1 | 2/2009 | Sarkar et al. | |
| 2009/0067391 A1* | 3/2009 | Shen | H04L 1/0027 370/336 |
| 2009/0154588 A1 | 6/2009 | Chen et al. | |
| 2009/0201825 A1* | 8/2009 | Shen | H04L 1/0026 370/252 |
| 2009/0238256 A1* | 9/2009 | Onggosanusi et al. | 375/228 |
| 2010/0046412 A1 | 2/2010 | Varadarajan et al. | |
| 2010/0091893 A1 | 4/2010 | Gorokhov | |
| 2010/0118989 A1 | 5/2010 | Sayana et al. | |
| 2010/0195566 A1 | 8/2010 | Krishnamurthy et al. | |
| 2010/0322100 A1 | 12/2010 | Wan et al. | |
| 2011/0159901 A1 | 6/2011 | Frenger et al. | |
| 2011/0293037 A1* | 12/2011 | Liu et al. | 375/295 |

OTHER PUBLICATIONS

3GPP TSG-RAN WG1 #56, R1-091066, Feb. 9-13, 2009.
3GPP TSG-RAN WG1 Meeting #56bis, R1-091221, Mar. 23-27, 2009.
3GPP TS 36.213 V8.5.0 (Dec. 2008), 3rd Generation Partnership Project; Technical Specification Group Radio Access Network; Evolved Universal Terrestrial Radio Access (E-UTRA); Physical layer procedures (Release 8).
3GPP TS 36.211 V8.5.0 (Dec. 2008), 3rd Generation Partnership Project; Technical Specification Group Radio Access Network; Evolved Universal Terrestrial Radio Access (E-UTRA); Physical Channels and Modulation (Release 8).
3GPP TSG-RAN Working Group 1 Meeting #56, ZTE, R1-090632, Feb. 9-13, 2009.
3GPP TSG-RAN1 #54, Motorola, R1-083224, Aug. 18-22, 2008.
PTO-892 dated Jun. 2013; U.S. Appl. No. 13/257,462.
CN Office Action dated Jul. 31, 2013, with English translation; Application No. 201080012550.5.
Extended European Search Report dated Dec. 21, 2012 in corresponding European Application No. 12182932.9.
QUALCOMM Europe: "Impact of Downlink CoMP on the Air Interface", 3GPP Draft; R1-090366, 3rd Generation Partnership Project (3GPP), Mobile Competence Centre; 650, Route Des Lucioles; F-06921 Sophia-Antipolis Cedex; France, no. Ljubljana; Jan. 8, 2009, XP050318270.
Korean Official Action—10-2011-7024554—Aug. 10, 2012.
Huawei, "DL Coordinated Beam Switching for Interference management in LTE-Advanced," 3GPP TSG RAN WG1#54bis, R1-083710 (Sep. 29-Oct. 3, 2008).
US Office Action dated Nov. 21, 2013; U.S. Appl. No. 13/590,695.
NTT DoCoMo, DL RS Design for LTE-Advanced, 3GPP TSG RAN WG1 Meeting #56bis R1-091483, pp. 1-7, Mar. 23-27, 2009.
Nokia, Nokia Siemens Networks, CSI-RS design for LTE-Advanced downlink, 3GPP TSG RAN WG1 Meeting #56-bis R1-091351, pp. 1-8, Mar. 23-27, 2009.
Samsung, DL RS Designs for Higher Order MIMO, 3GPP TSG RAN WG1 #56 R1-090619, pp. 1-7, Feb. 9-13, 2009.
TD Tech, Dedicated RS design w/wo overhead reduction, 3GPP TSG RAN WG1#52bis R1-081338, pp. 1-3, Mar. 4, 2008.
Japanese Official Action—2013-208237—May 27, 2014.

\* cited by examiner

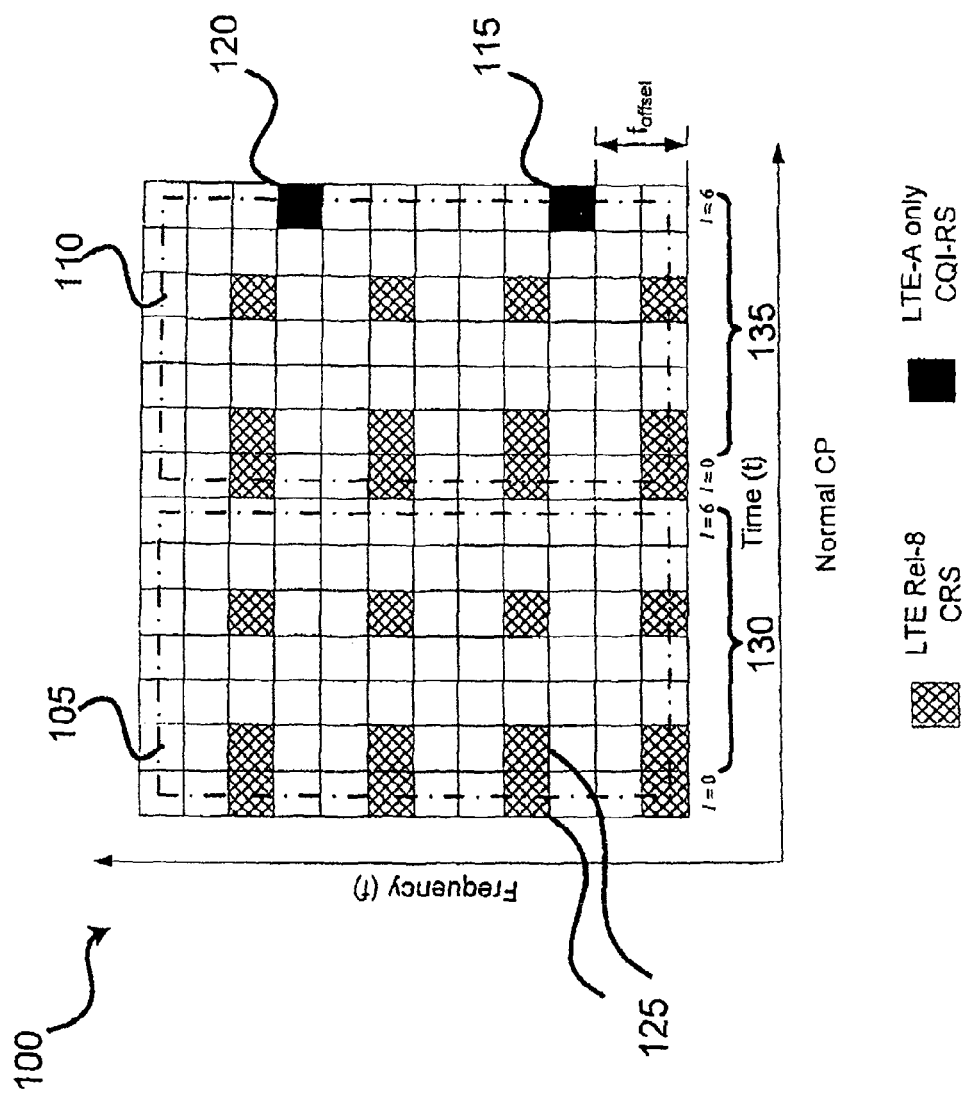

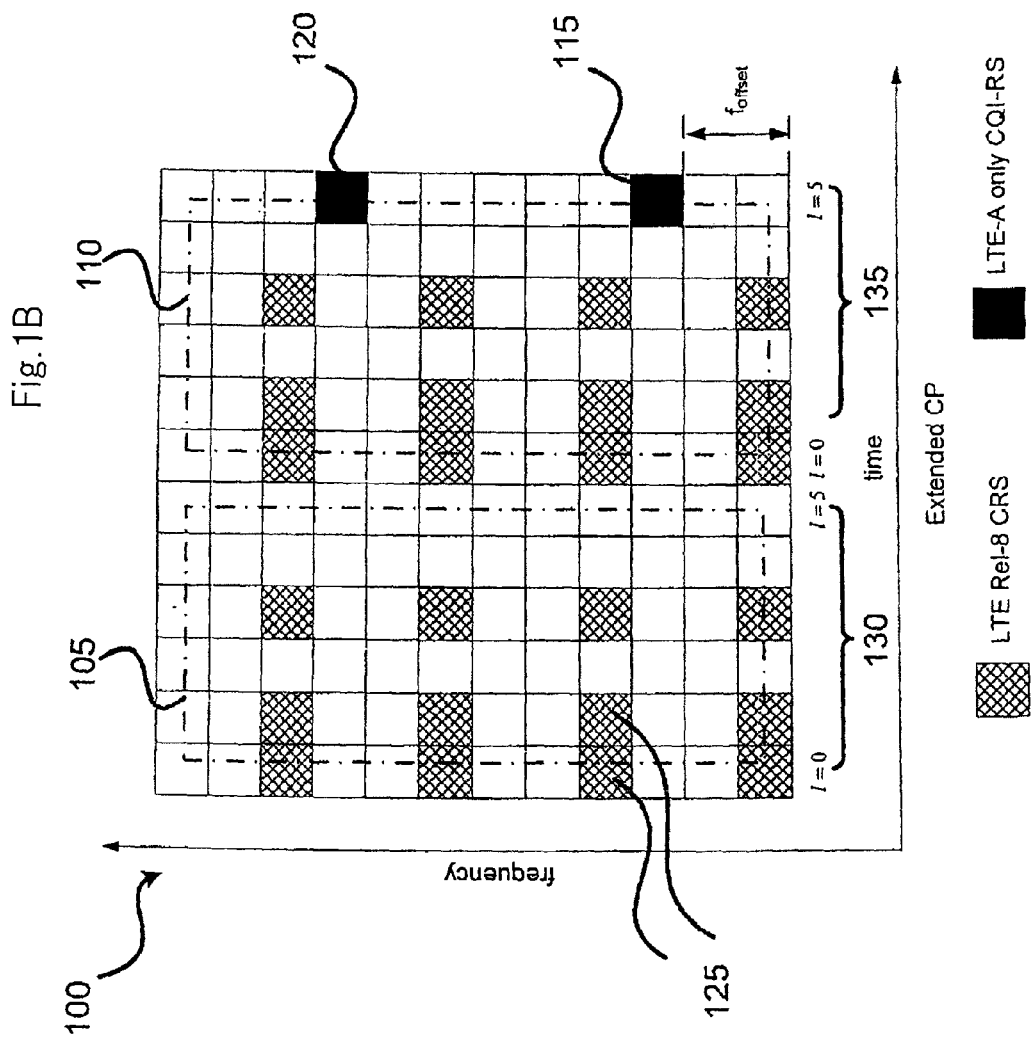

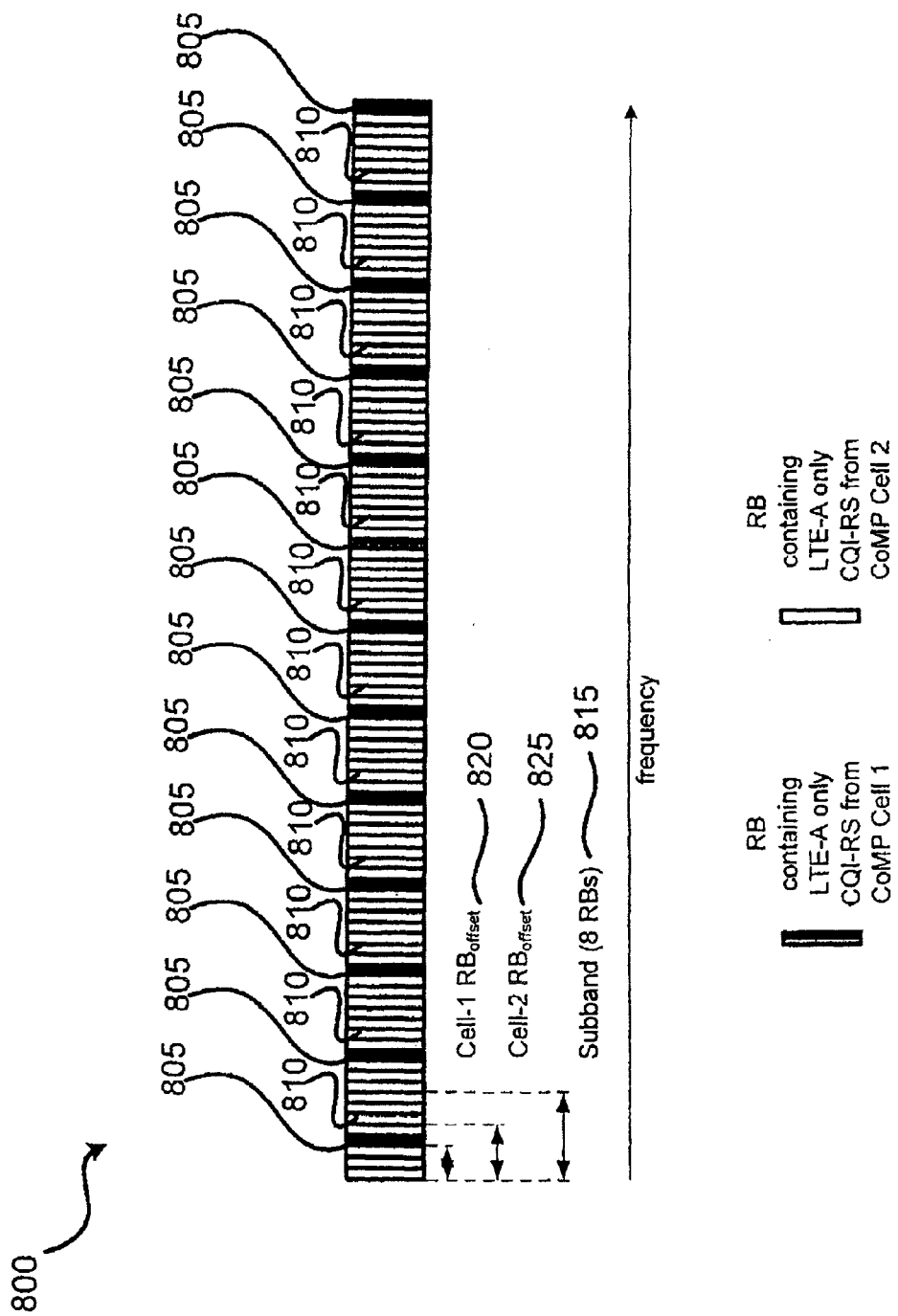

CHANNEL QUALITY INDICATOR METHOD, AND ASSOCIATED SYSTEM, BASE STATION, AND USER EQUIPMENT

CROSS REFERENCE TO RELATED APPLICATIONS

This application is a division of application Ser. No. 13/590,695 filed on Aug. 21, 2012, which is a division of application Ser. No. 13/543,172 filed on Jul. 6, 2012, which is a division of application Ser. No. 13/257,462 filed on Sep. 19, 2011, which is a National Stage of PCT/JP2010/055144 filed on Mar. 17, 2010, which claims foreign priority to Australian Application No. 2009901196 filed on Mar. 19, 2009. The entire contents of each of these applications are hereby expressly incorporated by reference.

TECHNICAL FIELD

The present invention relates to wireless communications systems, and more particularly to a method for determining and transmitting Channel Quality Indicator Reference Signals (CQI-RS) from one or more subframes such that an associated User Equipment (UE) can use the CQI-RS to measure CQI.

BACKGROUND ART

In advanced mobile communication systems, such as the Long-Term-Evolution (LTE) system and the Long-Term-Evolution Advanced (LTE-A) system, User Equipment (UE) is utilised to measure and to report a number of parameters in the communication system including Rank Indicator (RI), Channel Quality Indicator (CQI) or Precoding Matrix Indicator (PMI) to the evolved Node B (eNB) thereby enabling support of resource allocation, link adaptation and spatial multiplexing transmission.

Currently, LTE (Release-8) RI, CQI/PMI measurement is performed based on the cell-specific reference signals (CRS). Each CRS is associated with transmit antenna ports at the eNB (there is a maximum of 4 transmit antenna ports). Therefore, the maximum number of transmission layers that can be supported for spatial multiplexing is limited by the number of antenna ports available (i.e. 4).

It is envisaged that for LTE-A (Release-10), the number of antenna ports used for spatial multiplexing or the number of transmission layers should be up to 8. Therefore, more Reference Signals are needed to enable the support of higher-order MIMO transmission.

Further, a new technology under consideration for LTE-A is Coordinated Multi-Point (CoMP) transmission. The LTE-A UE may therefore also be required to measure and report the RI, CQI/PMI (or similar metric) for the Reference Signal transmitted from the eNBs that participate in CoMP transmission.

A problem with this increase in complexity is the possibility of interference to signals important for basic system operation together with backward compatibility issues on older UEs.

It would therefore be desirable to provide a method which will work with future versions of LTE-A, be backwards compatible and alleviate interference to signals for basic system operation.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

DISCLOSURE OF THE INVENTION

A improved channel quality indicator method for determining and transmitting one or more Channel Quality Indicator Reference Signals from one or more subframes such that an associated User Equipment can use the Channel Quality Indicator Reference Signals to measure Channel Quality Indicator, the subframes including first and second slots, each of the first and second slots including a plurality of symbols, and each of the first and second slots forming a resource block, wherein the method comprising:
  generating one or more Reference Signals associated with the one or more Channel Quality Indicators;
  mapping the one or more Channel Quality Indicator-Reference Signals to the last symbol of the second slot of the one or more subframes.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

BRIEF DESCRIPTION OF THE DRAWINGS

FIG. 1A is a schematic diagram of a subframe having two normal Cyclic Prefix (CP) resource blocks illustrating the location of the CQI-RS for one layer;

FIG. 1B is a schematic diagram of a subframe having two extended Cyclic Prefix (CP) resource blocks illustrating the location of the CQI-RS for one layer;

FIG. 8 is a schematic diagram of bandwidth of subframes illustrating the use of the resource block offset parameter $RB_{offset}$ suitable for CoMP cells.

CARRYING OUT THE INVENTION

Figure 2:
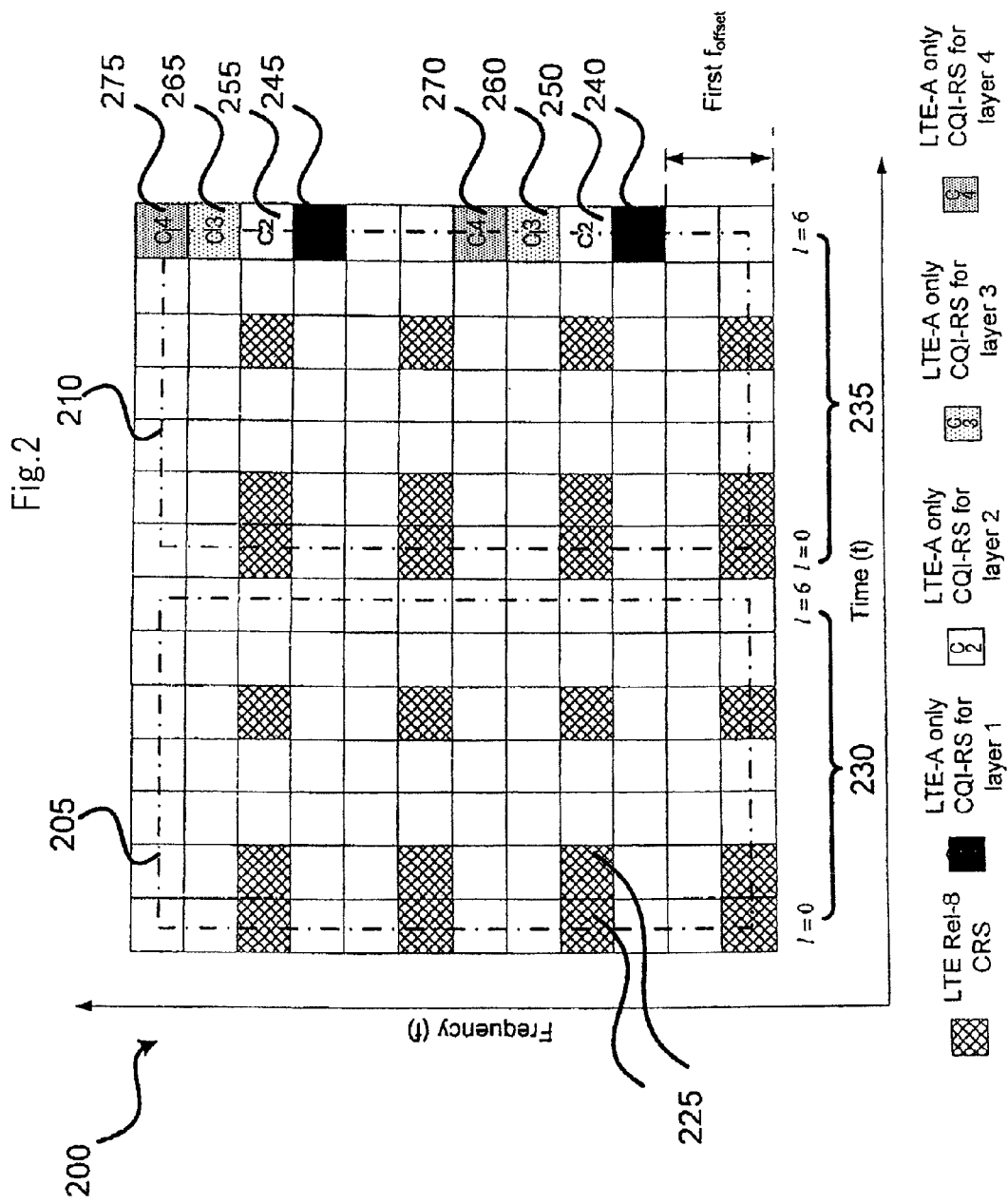
FIG. 2 is a schematic diagram of a subframe having two normal Cyclic Prefix (CP) resource blocks illustrating the location of the CQI-RS for multiple layers for multiplexing via (Frequency Division Multiplexing) FDM.

Exemplary embodiments of the present invention are next described in detail with reference to the accompanying figures Referring now to FIG. 1A, there is shown a subframe 100 having two normal Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency (f). Included in each of the slots 130, 135 are seven symbols along the time axis for a normal Cyclic Prefix resource block 105, 110. A number of resource elements which make up the overall resource block 105, 110 are cell-specific reference signals (CRS) 125 and first and second "Long Term Evolution-Advanced Channel Quality Indicator-Reference Signal" (LTE-A CQI-RS) 115, 120.

In operation, the CQI-RS of a layer is transmitted in last OFDM symbol (i.e. OFDM symbol number 6 in the second slot 135), in order to avoid collision with Rel-8 cell-specific reference signals (CRS), Rel-8 Dedicated Reference Signal (DRS), and Physical Broadcast CHannel (PBCH) and synchronisation signals. Preferably, there are two CQI-RS REs within a resource block 105, 110 and the CQI-RSs are uniformly distributed over the 12 subcarriers of the resource block. Providing two CQI-RS REs for each layer is advantageous since it has been found to provide a good balance between CQI-RS overhead and CQI measurement performance.

Also shown in FIG. 1A, is a first cell-specific subcarrier offset $f_{offset}$ for higher-layer configurations. First $f_{offset}$ determines the Resource Element (RE) location offset of the CQI-RS from the lowest subcarrier index in a resource block. This is shown in FIG. 1A for First $f_{offset}$=2. In the preferred case of two CQI-RS REs per resource block, First $f_{offset}$ can take value from 0-5.

FIG. 1B is identical to FIG. 1A but illustrates a subframe 100 which includes two extended Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency (f). Each of the slots 130, 135 are six symbols along the time axis for an extended Cyclic Prefix resource block 105, 110. In operation, the CQI-RS of a layer is transmitted in last OFDM symbol (i.e. OFDM symbol number 5 in the second slot 135).

Advantageously, by designing CQI-RS for all layers applicable to LTE-A operation to be placed in only one particular OFDM symbol within a subframe provides a simple way to avoid interference to/from Rel-8 CRS, Rel-8 DRS, and PBCH and synchronisation signals.

FIG. 2 is shows a subframe 200 having two normal Cyclic Prefix (CP) resource blocks 205, 210 and further shows the preferred location of the CQI-RS for multiple layers for multiplexing via Frequency Division Multiplexing. Like FIGS. 1A and 1B, the subframe 200 is shown with a frequency (f) axis and a time (t) axis. The resource blocks 205, 210 are transmission units which are one slot 230, 235 wide in time (t) and twelve subcarriers wide in frequency (f). Each of the slots 230, 235 include seven symbols along the time axis for a normal Cyclic Prefix resource block 205, 210. A number of resource elements make up the resource block 205, 210 including cell-specific reference signals (CRS) 225 together with first LTE-A CQI-RS 240 (layer 1), second LTE-A CQI-RS 245 (layer 1), first LTE-A CQI-RS 250 (layer 2), second LTE-A CQI-RS 255 (for layer 2), first LTE-A CQI-RS 260 (layer 3), second LTE-A CQI-RS 265 (layer 3), first LTE-A CQI-RS 270 (layer 4) and second LTE-A CQI-RS 275 (layer 4).

In FIG. 2, CQI-RS of all layers for LTE-A operation are transmitted in the same OFDM symbol (i.e. symbol number 6) for the case that the layers are multiplexed via FDM. The particular arrangement within the FDM framework is illustrative, other arrangements are possible.

Figure 3:
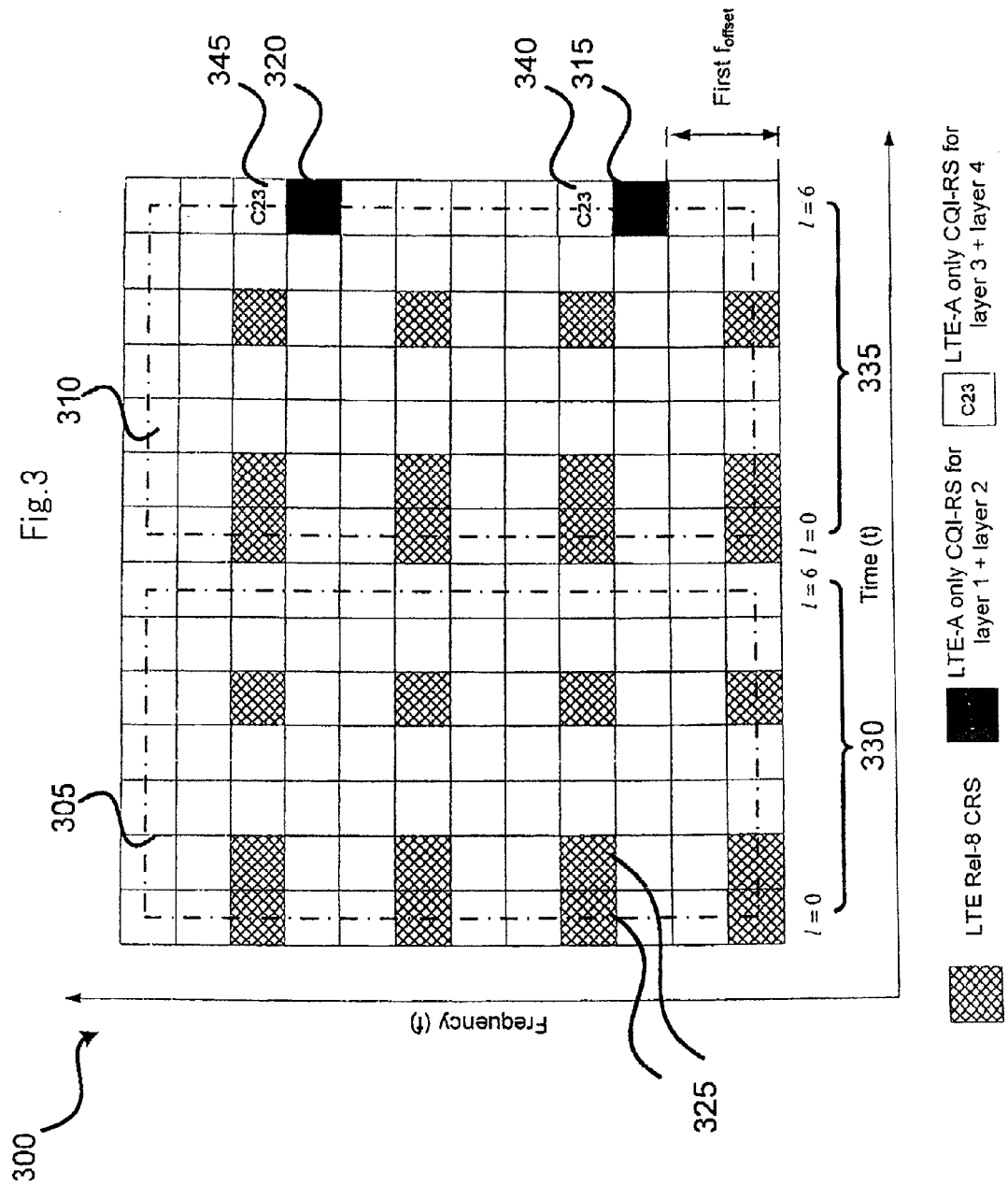
FIG. 3 is a schematic diagram of a subframe having two normal Cyclic Prefix (CP) resource blocks illustrating the location of the CQI-RS for multiple layers for multiplexing via hybrid FDM and (Code Division Multiplexing) CDM.

FIG. 3 shows a subframe 300 having two normal Cyclic Prefix (CP) resource blocks 305, 310 and further shows the preferred location of the CQI-RS for multiple layers for multiplexing via hybrid Frequency Division Multiplexing (FDM) and Code Division Multiplexing (CDM). A number of resource elements make up the resource block 305, 310 including cell-specific reference signals (CRS) 325 together with first LTE-A CQI-RS 315 (layer 1 and layer 2), second LTE-A CQI-RS 320 (layer 1 and layer 2), first LTE-A CQI-RS 340 (layer 3 and layer 4) and second LTE-A CQI-RS 345 (layer 3 and layer 4).

In FIG. 3, CQI-RS of all layers for LTE-A operation are transmitted in the same OFDM symbol (i.e. symbol number 6) for the case that the layers are multiplexed hybrid via FDM and CDM. The particular arrangement within the hybrid FDM and CDM framework is illustrative, other arrangements are possible.

Figure 4:
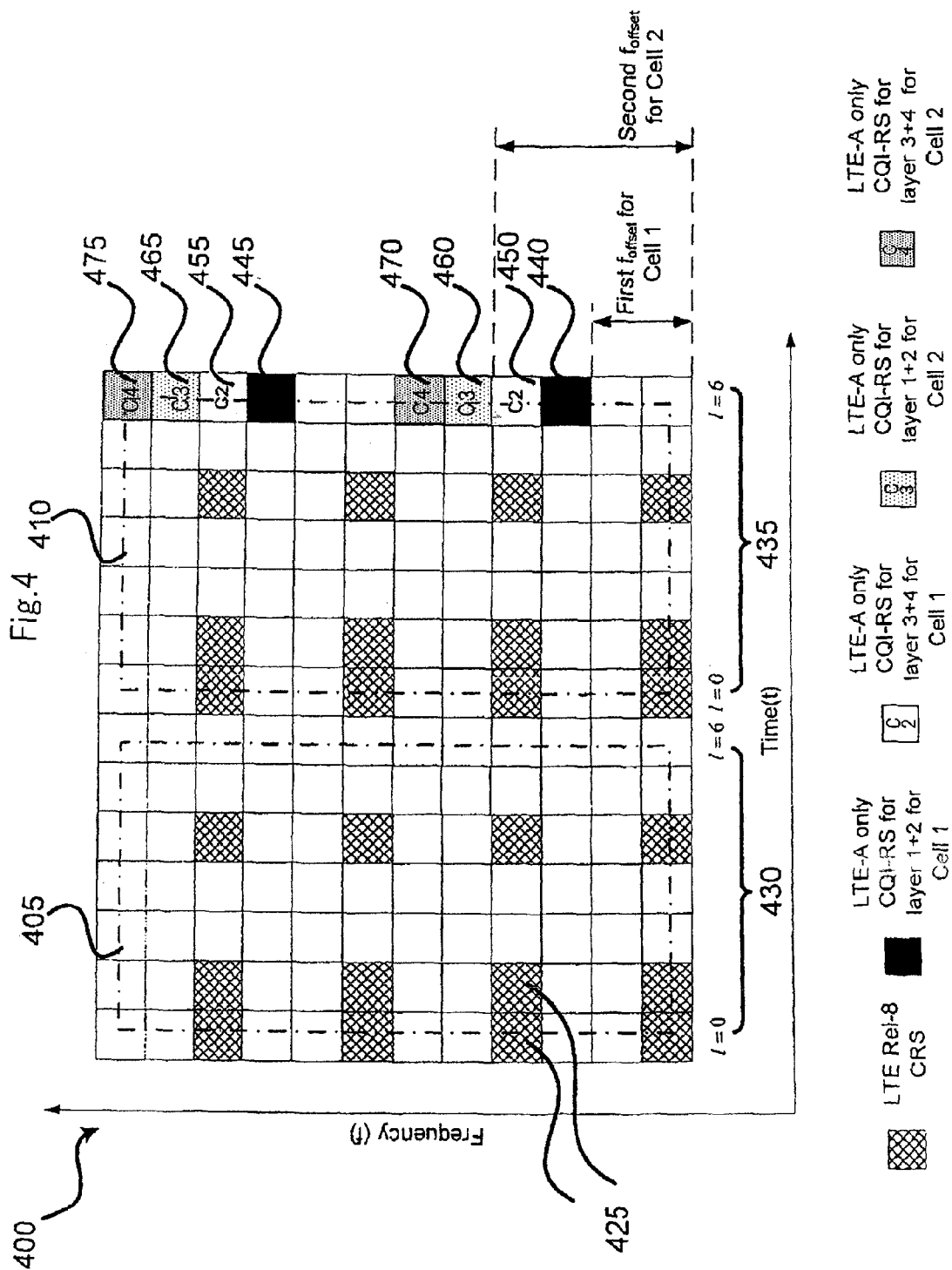
FIG. 4 is a schematic diagram of a subframe having two normal Cyclic Prefix (CP) resource blocks illustrating the location of the CQI-RS for multiple layers for CoMP cells multiplexed via hybrid FDM and CDM.

FIG. 4 shows a subframe 400 having two normal Cyclic Prefix (CP) resource blocks 405, 410 illustrating the location of the CQI-RS for multiple layers for CoMP cells multiplexed via hybrid FDM and CDM. In operation, the CQI-RS of a layer is transmitted in last OFDM symbol (i.e. OFDM symbol number 6 in the second slot 435), in order to mitigate CQI-RS intercell interference. The intercell interference is further reduced by including a first cell-specific subcarrier offset First $f_{offset}$ and a second cell-specific subcarrier offset Second $f_{offset}$. First $f_{offset}$ determines the Resource Element (RE) location offset of the CQI-RS from the lowest subcarrier index of a resource block for Cell-1. This is shown in FIG. 4 for First $f_{offset}$=2. Second $f_{offset}$ determines the Resource Element (RE) location offset of the CQI-RS from the lowest subcarrier index of a resource block for Cell-2. This is shown in FIG. 4 for Second $f_{offset}$=4. Therefore, LTE-A CQI-RS are as follows: first LTE-A CQI-RS 440 (layer 1 and 2 for cell 1), second LTE-A CQI-RS 445 (layer 1 and 2 for cell 1), first LTE-A CQI-RS 450 (layer 3 and 4 for cell 1), second LTE-A CQI-RS 455 (layer 3 and 4 for cell 1), first LTE-A CQI-RS 460 (layer 1 and 2 for cell 2), second LTE-A CQI-RS 465 (layer 1 and 2 for cell 2), first LTE-A CQI-RS 470 (layer 3 and 4 for cell 2) and second LTE-A CQI-RS 475 (layer 3 and 4 for cell 2).

Advantageously, $f_{offset}$ allows for robust intercell interference management for CoMP CQI-RS transmission.

Transmission Period Configuration of LTE-A Only CQI-RS

Figure 5:
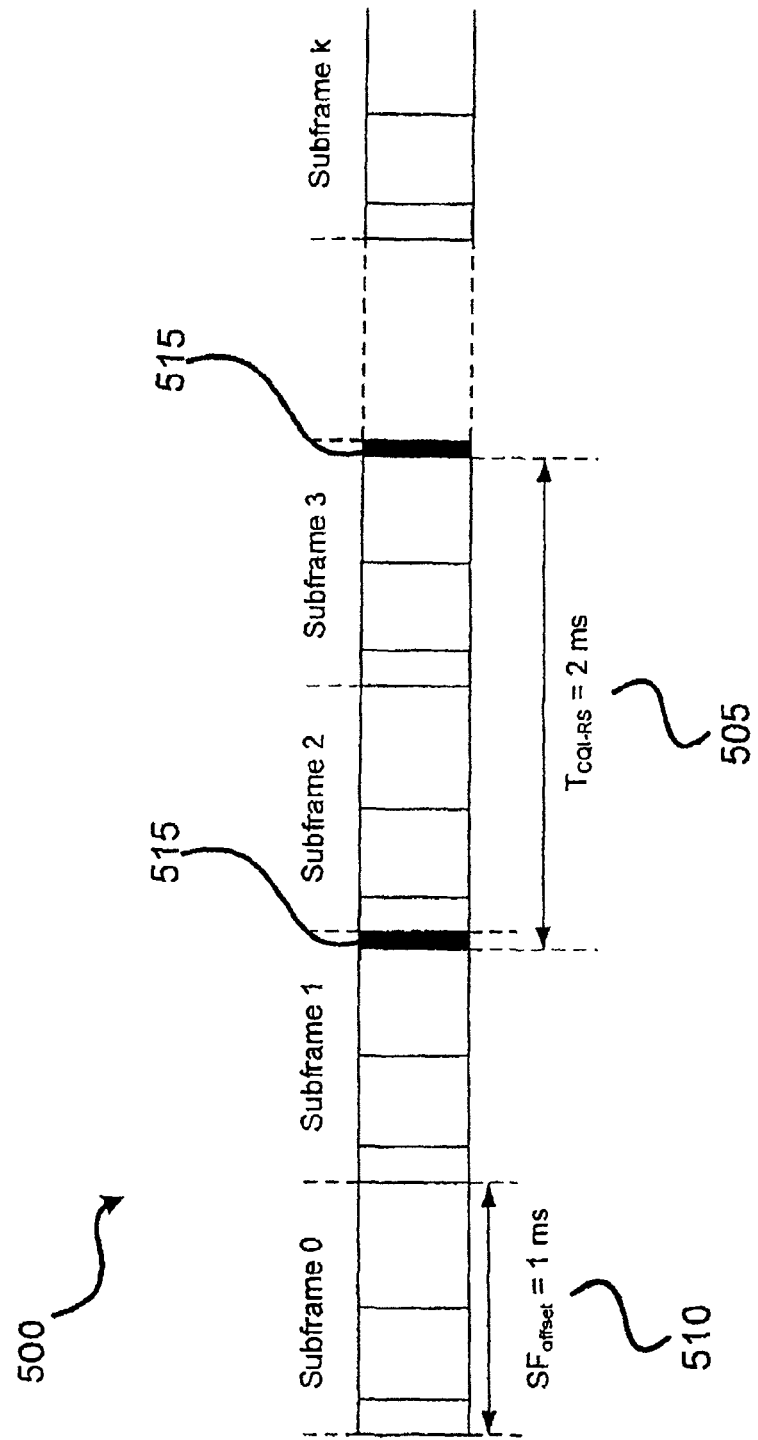
FIG. 5 is a schematic diagram of a series of subframes illustrating use of a cell-specific subframe offset.

FIG. 5 is a schematic diagram of a series of subframes 500 illustrating use of a cell-specific subframe offset SFoffset 510 and the CQI-RS transmission period, $T_{CQI-RS}$ 505. $T_{CQI-RS}$ 505 is the same as the CQI/PMI reporting period for LTE Rel-8, i.e. 2 ms, 5 ms, 10 ms, 20 ms, 40 ms, 80 ms and 160 ms for Frequency Division Duplex (FDD), and 1 ms, 5 ms, 10 ms, 20 ms, 40 ms, 80 ms and 160 ms for Time Division Duplex (TDD). However, $T_{CQI-RS}$ 505 is cell-specific while the CQI/PMI reporting period is UE-specific, hence the configuration of $T_{CQI-RS}$ 505 and CQI/PMI reporting period are independent. In practice, the CQI/PMI reporting period is generally not shorter than $T_{CQI-RS}$ 505.

Higher-layer configured cell-specific subframe offset SFoffset 510 determines the subframe offset for CQI-RS transmission relative to subframe 0 within a frame. SFoffset takes the value from 0 ms to (TCQI-RS−1) ms. FIG. 5 shows a $T_{CQI-RS}$ 505 of 2 ms and SFoffset of 1 ms. The final resource block of subframes 1 and 3 are shown as element 515.

Advantageously, $T_{CQI-RS}$ 505 is useful in controlling the CQI-RS overhead whereas SFoffset 510 is useful for mitigating CQI-RS intercell interference among CoMP cells.

Figure 6:
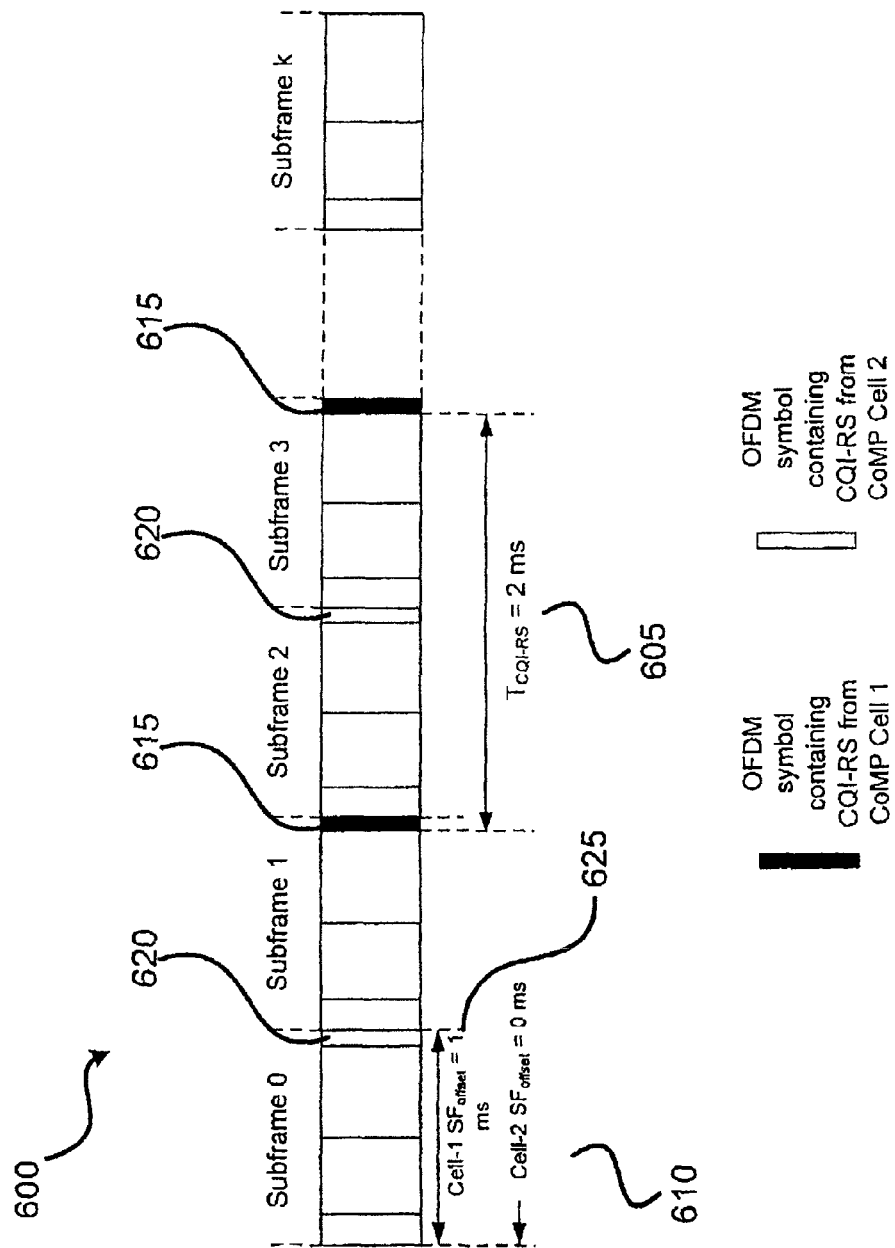
FIG. 6 is a schematic diagram of a series of subframes illustrating use of a cell-specific subframe offset designed for CoMP cells.

FIG. 6 shows a series of subframes 600 and illustrates an example of how SFoffset can be used to avoid CQI-RS of different CoMP cells being transmitted in the same subframe. In this case Cell-1 SFoffset 625 has a value of 1 ms and Cell-2 SFoffset 610 has a value of 0 ms and a $T_{CQI-RS}$ 605 of 2 ms. The final resource block of subframes 0 and 2 are shown as element 620; and the final resource block of subframes 1 and 3 are shown as element 615.

Resource Block Allocation for LTE-A Only CQI-RS

The CQI-RS subband which may be denoted k is defined in the similar way as the CQI-reporting subband for LTE Rel-8. The CQI-RS subband size or equivalently the total number of resource blocks that contain CQI-RS is determined based on the system bandwidth for a single component carrier, similar to the CQI-reporting subband size determination for LTE Rel-8. Specifically, the CQI-RS subband size is determined as shown in Table 1.

TABLE 1

CQI-RS Subband Size k vs. System Bandwidth of a single component carrier

| System Bandwidth of a single component carrier | CQI-RS Subband Size, k |
| --- | --- |
| 6-7 | Entire system bandwidth |
| 8-10 | 4 |
| 11-26 | 4 |
| 27-63 | 6 |
| 64-110 | 8 |

Figure 7:
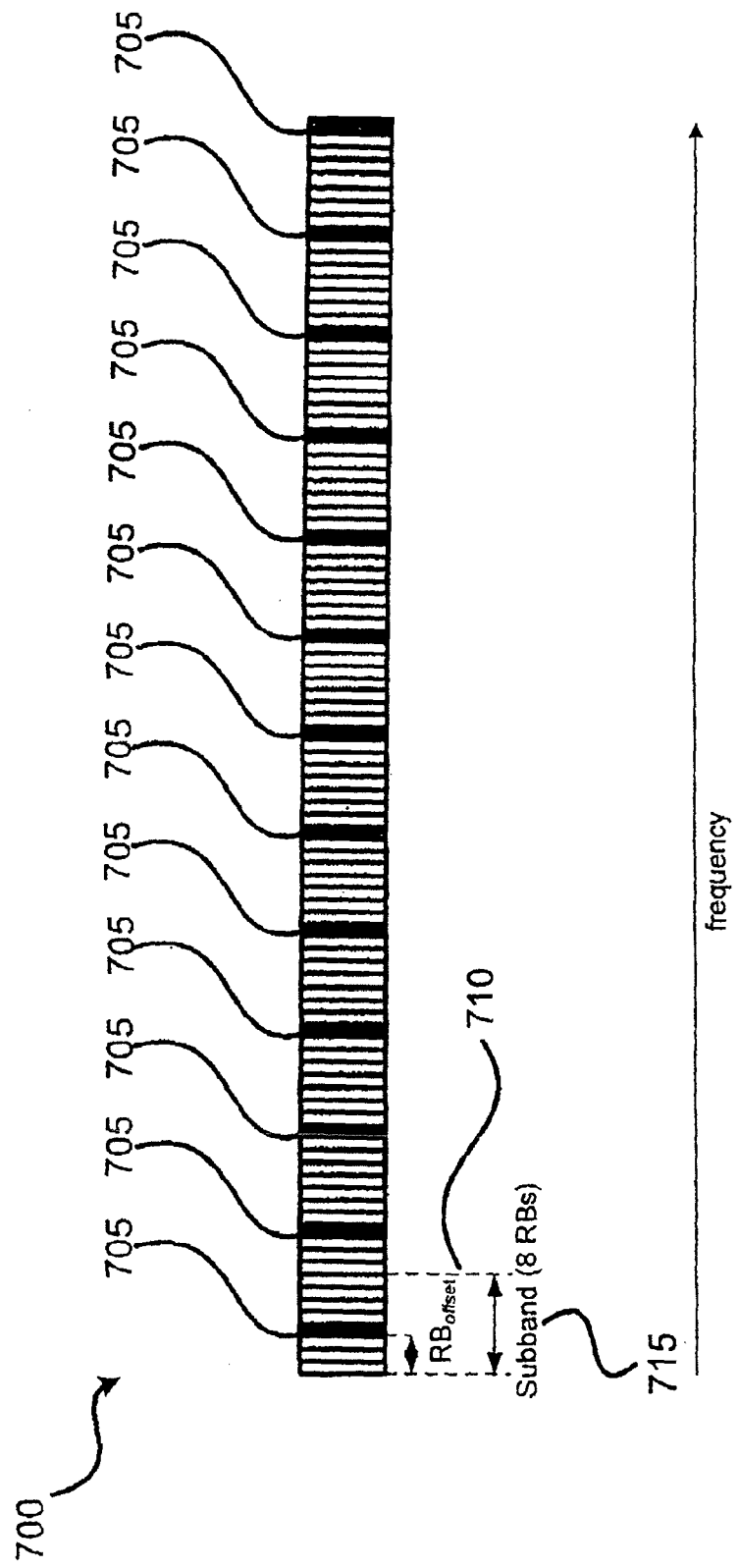
FIG. 7 is a schematic diagram of bandwidth of subframes illustrating the use of the resource block offset parameter $RB_{offset}$.

There is only one resource block in a CQI-RS subband that contains CQI-RS. With this in mind, FIG. 7 shows a schematic diagram of bandwidth (20 Mhz) of subframes 700 (having eight resource blocks in each subband 715) illustrating the use of the resource block offset parameter $RB_{offset}$ 710. Each subband 715 includes a resource block 705 which contains CQI-RS (the subband size=8 resource blocks). The exact location of the resource block that contains CQI-RS is determined by the parameter RBoffset 710. RBoffset ranges from 0 to k−1.

RBoffset 710 can be either configured by a higher-layer or can cycle from the first resource block to the last resource block within the subband as subframe number increments (i.e. round-robin allocation of the CQI-RS to the resource blocks within the subband).

Advantageously, the parameter RBoffset can also be used to mitigate CQI-RS intercell interference among CoMP cells as shown in FIG. 8. In FIG. 8 there shown a Cell-1 RBoffset 820 and a Cell-2 RBoffset 825 within a subband 815. The two offsets are used to avoid CQI-RS of different CoMP cells being transmitted in the same resource block. In case of the round-robin assignment, collision can be avoided by configuring different starting position for different CoMP cell for the round-robin operation.

Advantageously, there is only one resource block in a CQI-RS subband that contains CQI-RS. The total number of resource blocks that contain CQI-RS is determined based on the system bandwidth for a single component carrier. Advantageously, the resource blocks containing CQI-RS are uniformly distributed over the system bandwidth which means it is able to cover the entire system bandwidth (within a component carrier). This is known as the "wideband" requirement in LTE-A. In a further advantage, the arrangement minimises the impact on legacy User Equipment (e.g. LTE Rel-8) by minimising the number of resource blocks that contains CQI-RS within a subband.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

This application is based upon and claims the benefit of priority from Australian provisional patent application No. 2009901196 filed on Mar. 19, 2009 the disclosure of which is incorporated herein in its entirety by reference.

The invention claimed is:

1. A method implemented in a user equipment (UE) used in a wireless communications system, comprising:
   receiving from a base station two channel quality indicator (CQI) reference signals in a subframe; and
   transmitting to the base station a report determined according to said two CQI reference signals,
   wherein the CQI reference signal transmission is repeated at CQI reference signal transmission period $T_{CQI-RS}$,
   wherein a subframe offset relative to subframe 0 is provided for the CQI reference signal transmission, and
   wherein the subframe comprises a resource block and a last OFDM (orthogonal frequency division multiplexing) symbol in the resource block conveys said two CQI reference signals.

2. The method according to claim 1, wherein the report comprises at least one of a rank indicator (RI), a CQI, and a precoding matrix indicator (PMI).

3. The method according to claim 1, wherein the CQI reference signal transmission avoids collision with a Cell-specific Reference Signal (CRS), a Dedicated Reference Signal (DRS), a Physical Broadcast CHannel (PBCH), or a synchronization signal.

4. The method according to claim 1, wherein the CQI reference signal transmission period is one of 5 ms, 10 ms, 20 ms, 40 ms, 80 ms, and 160 ms.

5. The method according to claim 1, wherein the CQI reference signal transmission period is one of 2 ms, 5 ms, 10 ms, 20 ms, 40 ms, 80 ms, and 160 ms for Frequency Division Duplex (FDD) transmission.

6. The method according to claim 1, wherein the CQI reference signal transmission period is one of 1 ms, 5 ms, 10 ms, 20 ms, 40 ms, 80 ms, and 160 ms for Time Division Duplex (TDD) transmission.

7. The method according to claim 1, wherein the CQI reference signal transmission period is cell-specific and a CQI or PMI reporting period is UE-specific.

8. The method according to claim 1, wherein a CQI or PMI reporting period is equal to or longer than the CQI reference signal transmission period.

9. The method according to claim 1, wherein the subframe offset takes a value from 0 ms to ($T_{CQI-RS}$−1 ms) where $T_{CQI-RS}$ denotes the CQI reference signal transmission period.

10. The method according to claim 1, wherein the subframe offset is cell-specific.

11. The method according to claim 1, wherein said one or more CQI reference signals are used for one or more antenna ports for spatial multiplexing, the number of said one or more antenna ports being equal to or less than 8, or for one or more transmission layers, the number of said one or more transmission layers being equal to or less than 8.

12. The method according to claim 1, wherein a CQI reference signal position depends on a cyclic prefix (CP) length.

13. The method according to claim 1, wherein the base station is configured to be used in a Coordinated Multi-Point (CoMP) transmission.

14. A method implemented in a base station used in a wireless communications system, comprising:
transmitting to a user equipment (UE) two channel quality indicator (CQI) reference signals in a subframe; and
receiving from the user equipment a report determined according to said two CQI reference signals,
wherein the CQI reference signal transmission is repeated at a CQI reference signal transmission period $T_{CQI\text{-}RS}$,
wherein a subframe offset relative to subframe 0 is provided for the CQI reference signal transmission, and
wherein the subframe comprises a resource block and a last OFDM (orthogonal frequency division multiplexing) symbol in the resource block conveys said two CQI reference signals.

15. The method according to claim 14, wherein the report comprises at least one of a rank indicator (RI), a CQI, and a precoding matrix indicator (PMI).

16. The method according to claim 14, wherein the CQI reference signal transmission avoids collision with a Cell-specific Reference Signal (CRS), a Dedicated Reference Signal (DRS), a Physical Broadcast CHannel (PBCH), or a synchronization signal.

17. The method according to claim 14, wherein the CQI reference signal transmission period is one of 5 ms, 10 ms, 20 ms, 40 ms, 80 ms, and 160 ms.

18. The method according to claim 14, wherein the CQI reference signal transmission period is one of 2 ms, 5 ms, 10 ms, 20 ms, 40 ms, 80 ms, and 160 ms for Frequency Division Duplex (FDD) transmission.

19. The method according to claim 14, wherein the CQI reference signal transmission period is one of 1 ms, 5 ms, 10 ms, 20 ms, 40 ms, 80 ms, and 160 ms for Time Division Duplex (TDD) transmission.

20. The method according to claim 14, wherein the CQI reference signal transmission period is cell-specific and a CQI or PMI reporting period is DE-specific.

21. The method according to claim 14, wherein a CQI or PMI reporting period is equal to or longer than the CQI reference signal transmission period.

22. The method according to claim 14, wherein the subframe offset takes a value from 0 ms to ($T_{CQI\text{-}RS}$−1 ms) where $T_{CQI\text{-}RS}$ denotes the CQI reference signal transmission period.

23. The method according to claim 14, wherein the subframe offset is cell-specific.

24. The method according to claim 14, wherein said one or more CQI reference signals are used for one or more antenna ports for spatial multiplexing, the number of said one or more antenna ports being equal to or less than 8, or for one or more transmission layers, the number of said one or more transmission layers being equal to or less than 8.

25. The method according to claim 14, wherein a CQI reference signal position depends on a cyclic prefix (CP) length.

26. The method according to claim 14, wherein the base station is configured to be used in a Coordinated Multi-Point (CoMP) transmission.

27. A base station used in a wireless communications system, comprising:
a transmitter configured to transmit to a user equipment (UE) two channel quality indicator (CQI) reference signals in a subframe; and
a receiver configured to receive from the user equipment a report determined according to said two CQI reference signals,
wherein the CQI reference signal transmission is repeated at a CQI reference signal transmission period $T_{CQI\text{-}RS}$,
wherein a subframe offset relative to subframe 0 is provided for the CQI reference signal transmission, and
wherein the subframe comprises a resource block and a last OFDM (orthogonal frequency-division multiplexing) symbol in the resource block conveys said two CQI reference signals.

28. A user equipment (UE) used in a wireless communications system, comprising:
a receiver to receive from a base station two channel quality indicator (CQI) reference signals in a subframe; and a transmitter configured to transmit to the base station a report determined according to said two CQI reference signals,
wherein the CQI reference signal transmission is repeated at CQI reference signal transmission period $T_{CQI\text{-}RS}$,
wherein a subframe offset relative to subframe 0 is provided for the CQI reference signal transmission, and
wherein the subframe comprises a resource block and a last OFDM (orthogonal frequency-division multiplexing) symbol in the resource block conveys said two CQI reference signals.

29. A method implemented in a wireless communications system, the method comprising:
transmitting from a base station to a user equipment (UE) two channel quality indicator (CQI) reference signals in a subframe; and
transmitting from the user equipment to the base station a report determined according to said two CQI reference signals,
wherein the CQI reference signal transmission is repeated at a CQI reference signal transmission period $T_{CQI\text{-}RS}$, and
wherein a subframe offset relative to subframe 0 is provided for the CQI reference signal transmission, and
wherein the subframe comprises a resource block and a last OFDM (orthogonal frequency division multiplexing) symbol in the resource block conveys said two CQI reference signals.

30. A wireless communications system comprising:
a user equipment configured to transmit a report determined according to two CQI reference signals;
a base station configured to transmit to the user equipment (UE) said two channel quality indicator (CQI) reference signals in a subframe,
wherein the CQI reference signal transmission is repeated at a CQI reference signal transmission period $T_{CQI\text{-}RS}$, and
wherein a subframe offset relative to subframe 0 is provided for the CQI reference signal transmission, and
wherein the subframe comprises a resource block and a last OF DM (orthogonal frequency division multiplexing) symbol in the resource block conveys said two CQI reference signals.

* * * * *